Nov. 7, 1939.  O. R. SCHREIBER  2,179,431
BUMPER FOR AUTOMOBILES AND THE LIKE VEHICLES
Filed Aug. 10, 1938  2 Sheets-Sheet 1
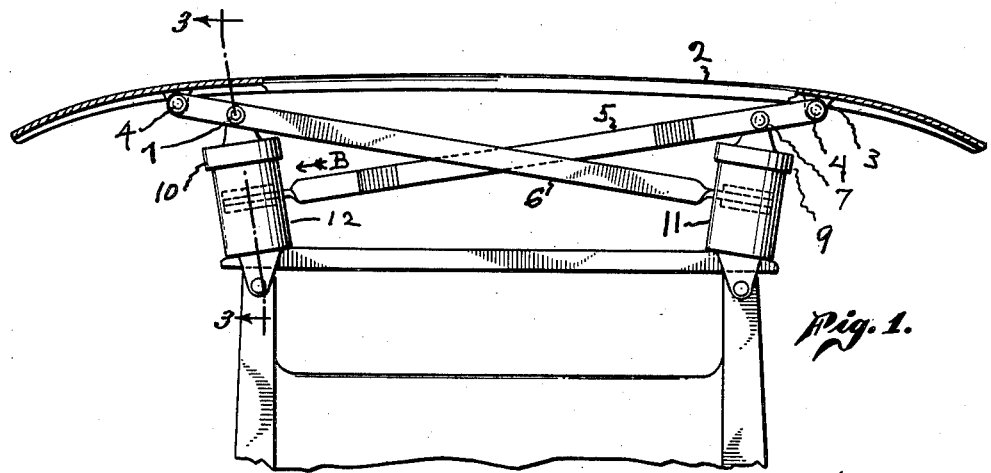
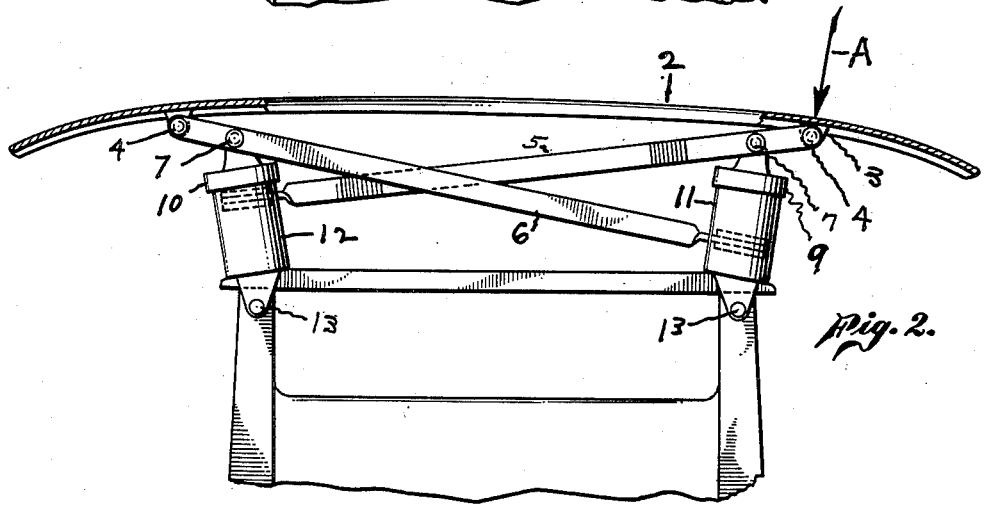
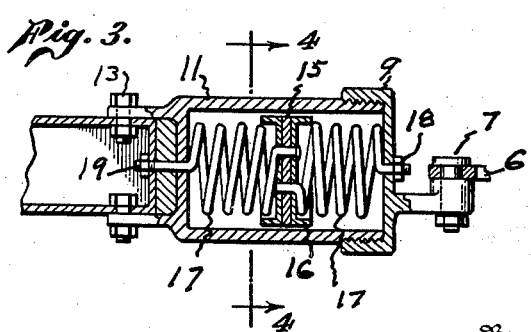
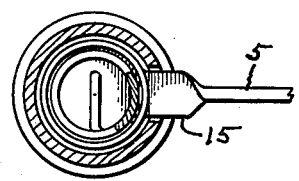
Inventor
O. RANDOLPH SCHREIBER,
By W. E. Williams
Attorney

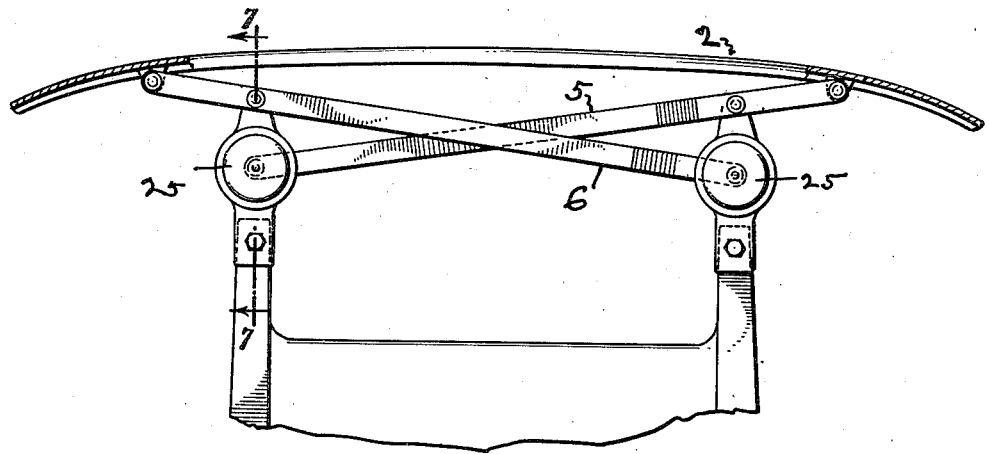
Fig. 6.
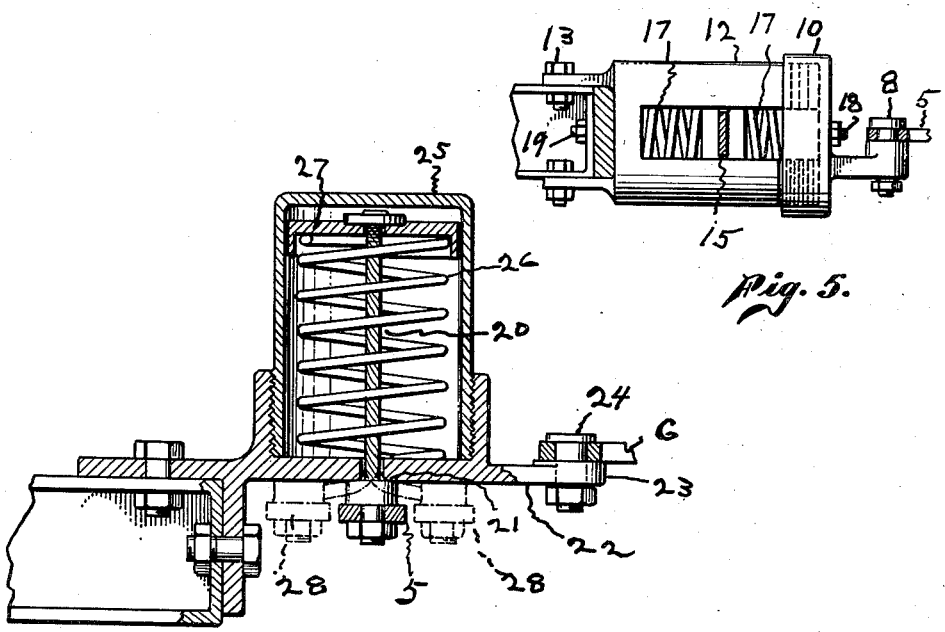
Fig. 5.
Fig. 7.

Patented Nov. 7, 1939

2,179,431

UNITED STATES PATENT OFFICE 2,179,431

BUMPER FOR AUTOMOBILES AND THE LIKE VEHICLES

Oscar Randolph Schreiber, Los Angeles, Calif.

Application August 10, 1938, Serial No. 224,012

5 Claims. (Cl. 293—55)

My invention relates to bumpers used chiefly on vehicles of the automobile type.

The object of the invention is to distribute the shock more evenly to be sustained by the vehicle with less danger of damage to the vehicle and to its occupants.

One particular advantage of the invention is to provide mechanisms that will yield under a pressure contact at one end of the bumper and convert that shock or pressure into a reverse direction at the other end of the bumper thereby lessening the direct backward force to move backwardly the entire vehicle which might take place in the absence of this construction.

Reference will be had to the accompanying drawings in which Figure 1 is a plan view of the bumper when not in collision. Figure 2 is a plan view when a shock has been contacted at the location of the arrow A at the right of the figure. Figure 3 is a vertical section on line 3—3 of Figure 1. Figure 4 is a horizontal section on line 4—4 of Figure 3. Figure 5 is an elevation looking in the direction of arrow B of Figure 1.

Figures 1 to 5 inclusive show the preferred construction.

A modified form is shown by Figures 6 and 7 of which Figure 6 is a plan and Figure 7 a section of detail on line 7—7 of Figure 6.

The bumper is provided with a collision bar or beam 2 which may be of any suitable form or shape desired and is provided with hinge pin lugs 3 connected by suitable pins 4 to transverse cross levers 5 and 6. These levers extend across at inclined relationships to each other between the hinge pins by which they are connected to the bumper beam and they are so inclined that they cross each other in appearance somewhat like an old fashioned saw buck and their reverse ends from the ends whereat they are hinged to the bumper beams are flattened out and are engaged by springs which are fixed to the frame of the vehicle. These levers 5 and 6 are connected by pins 7 to caps 9 and 10 of cylinders 11 and 12 which contain the springs to which the inner ends of the cross levers 5 and 6 are attached. The purpose of the springs is to allow and provide an elastic control of the ends of the levers 5 and 6 as they may move around the hinge pins 7 which pins act as fulcrums as the bumper beam may move them under collision. In place of the springs an elastic means such as air pistons may be substituted for controlling the movement of the inner ends of the levers 5 and 6.

The cylinders 11 and 12 are fixed by lugs 13 to the ends of the frame of the vehicle or fixed thereto in any suitable manner at such an angle as to compensate for the arc described by the lever ends connected to the springs when such levers move under impact.

The inner ends of the bars 5 and 6 are flattened and widened out as indicated by 15 in Fig. 3. On each side of the ends 15 of the levers 5 and 6 there are cup shaped retainer plates 16 which furnish seats for coil springs 17 which are fastened to the plates 16 and bar ends 15. The outer ends of the springs are threaded and are fixed in place by nuts 18 and 19 or are fixed in any other manner desired. Thus the inner ends of the levers 5 and 6 are held in place in movements through the cylinder by springs 17 which may yield in either direction as determined by the direction and location of a collision pressure on the bumper beam 2.

When a side collision takes place contacting the beam 2 at or near the location indicated by the arrow A as indicated by Fig. 2, the right end of lever 5 is pressed toward the vehicle while the left end is pushed from the vehicle thus making that lever exert a spring pressure in reverse direction from the collision impact. The above type of impact will at the same instant cause the bumper beam 2 at the right to move around as it were the hinge pin 4 at the right as a fulcrum and thus move the left end of lever 6 outward which will cause the right end of lever 6 to press toward the vehicle against the springs holding it in place. Where the collision is in the center the ends of the cross levers attached to the collision bar are depressed and the other ends of these levers will exert pressure on the springs in the reverse direction from the collision impact.

This arrangement of the bumper parts serves to equalize collision shock by distributing stresses more evenly and thus tend to lessen the collision damage.

The modified construction as indicated by Figs. 6 and 7 differs from that of the other figures only as relates to the arrangements of the springs and the inner ends of the levers 5 and 6. The bumper beam 2 is the same as in the other figures and is connected in the same manner to the levers 5 and 6. However the inner ends of those levers are connected to cables 20 which pass up through apertures 21 in blocks 22 which are bolted to the frame of the vehicle and are provided with lugs 23 into which pins 24 are passed that thus become the fulcrums of the levers in the same manner as the pins 7 before described.

The blocks 22 carry cylinder caps 25 into which are mounted springs 26 through which the cables 20 pass and are fixed to spring cover plates 27. The apertures 21 have rounded edges at their margins at the lower sides which permit the cables 20 to be pulled out around the bottom of the block 22 whenever the inner ends of the levers are moved by the action of the bumper beam 2. The dotted positions 28 indicate the movements of the inner ends of the levers in this modified form when such movements are produced by collision contact, in which movements result in compressing the springs 26 for elastic cushion effect for the same purposes as described for the constructions indicated by Figs. 1 to 5 inclusive or any other method of compressing the spring by the movement of the cross lever may be used.

The arrangement of the levers and springs are designed for the purpose of transmitting a shock contact on the bumper beam at either side of the center of the beam over to the other end of the cross lever, and because as one end of the bumper beam is depressed the other end moves outward, the cross lever attached to the other end of the bumper beam transmits part of the shock to the springs connected with its end; the arrangement in this modified form depresses the springs downward toward the earth converts the force into a downward force and thus takes advantage of the spring suspension of the vehicle in absorbing the shock. A shock contact in the center of the contact beam likewise engages the springs at the ends of both cross levers.

The spring arrangement is designed to produce an elastic or yielding contact to lessen the impact on the vehicle. Instead of springs any suitable other means such as air cushioned cylinders may be used in place of the springs.

The bearings of the hinge pins 4 and 7 have sufficient tolerance of clearance which together with the slight bending of the bumper beam 2 if and when that may take place as to prevent binding on the pins by the movements of the parts when in collision.

What I claim is:

1. A bumper of the class described having a front bumper beam, a set of cross levers hinged at regions at the opposite ends of the beam, hinge pin fulcrums for said levers fixed to caps of spring holding cylinders which cylinders are fixed to the frame of the machine and said levers mounted on said fulcrums, the said levers extending across between the said fulcrums and their inner ends engaged by springs contained within cylinders which springs control by elastic movements the actions of the levers about the fulcrums on which the levers are mounted.

2. In a bumper of the class described, a collision beam hinged at each end portion to cross levers, said cross levers hinged and supported to the vehicle by hinge pin fulcrums fixed to spring holding cylinders fixed to the frame of the machine and said cross levers extending across from the fulcrums with their other ends connected by spring association with the frame of the machine at opposite points from the respective fulcrums.

3. In a bumper of the class described, spring holding means secured to the frame of the machine, cross levers having their inside ends fixed to springs held by said means, and said cross levers extending crosswise of each other with their outer ends hinged to a bumper beam, fulcrum pin centers located in said spring holding means and hinge pins passing thru said cross arms and into said pin holding centers of said spring holding means.

4. In a bumper of the class described, a collision beam, cross levers hinged to said beam and hinged to fulcrums, spring holding cylinders supporting said fulcrums and fixed to the frame of the vehicle, springs mounted in said cylinders, the inner ends of said cross levers connected to the said springs.

5. In a bumper of the class described, a bumper beam, cross levers connected to said bumper beam and hinged to fulcrums, brackets fixed to the frame of the vehicle and upon which said fulcrums are supported, vertically arranged spring holding cylinders fixed to said brackets, springs mounted within said cylinders, flexible connections secured to the inner ends of said cross levers and extending up inside the springs and cylinders and connected to said springs so as to compress said springs as the inner ends of said cross levers move to withdraw said flexible connections from said cylinders.

O. RANDOLPH SCHREIBER.